(12) United States Patent
Tanizawa et al.

(10) Patent No.: US 8,136,144 B2
(45) Date of Patent: Mar. 13, 2012

(54) APPARATUS AND METHOD FOR CONTROLLING COMMUNICATION THROUGH FIREWALL, AND COMPUTER PROGRAM PRODUCT

(75) Inventors: Yoshimichi Tanizawa, Kanagawa (JP); Naoki Esaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1102 days.

(21) Appl. No.: 11/650,936

(22) Filed: Jan. 9, 2007

(65) Prior Publication Data

US 2007/0300289 A1   Dec. 27, 2007

(30) Foreign Application Priority Data

Jun. 26, 2006   (JP) ................. 2006-175688

(51) Int. Cl.
*G06F 15/16* (2006.01)
(52) U.S. Cl. .......... 726/3; 726/7; 726/11; 726/25
(58) Field of Classification Search .......... 726/3
See application file for complete search history.

(56) References Cited

U.S. PATENT DOCUMENTS

| 5,442,631 | A | * | 8/1995 | Tanaka et al. | 370/463 |
|---|---|---|---|---|---|
| 5,583,855 | A | * | 12/1996 | Ball | 370/376 |
| 5,586,269 | A | * | 12/1996 | Kubo | 340/9.16 |
| 5,784,380 | A | * | 7/1998 | Kuwahara | 370/509 |
| 5,825,780 | A | * | 10/1998 | Christie | 370/522 |
| 6,286,071 | B1 | * | 9/2001 | Iijima | 710/124 |
| 6,523,696 | B1 | * | 2/2003 | Saito et al. | 709/223 |
| 6,912,385 | B2 | * | 6/2005 | Namba et al. | 455/419 |
| 2002/0152375 | A1 | * | 10/2002 | Shigematsu et al. | 713/155 |
| 2003/0142681 | A1 | | 7/2003 | Chen et al. | |
| 2004/0158743 | A1 | * | 8/2004 | Ham et al. | 713/201 |
| 2006/0031929 | A1 | * | 2/2006 | Saito | 726/11 |
| 2009/0126022 | A1 | * | 5/2009 | Sakaki | 726/25 |
| 2009/0205031 | A1 | * | 8/2009 | Sato et al. | 726/7 |

FOREIGN PATENT DOCUMENTS

| EP | 1 146 711 A1 | 10/2001 |
|---|---|---|
| JP | 2006-25354 | 1/2006 |
| JP | 2006-114991 | 4/2006 |
| WO | WO 2005/101217 A1 | 10/2005 |

OTHER PUBLICATIONS

G. Camarillo et al., "Requirements from SIP (Session Initiation Protocol) Session Border Control Deployments," Internet Draft (work in progress), J. Hautakorpi, Ed., pp. 1-23 (Jun. 8, 2006).*

Office Action issued by the Japanese Patent Office on Sep. 30, 2008, for Japanese Patent Application No. 2006-175688, and Partial English Translation thereof.

* cited by examiner

*Primary Examiner* — Kambiz Zand
*Assistant Examiner* — Yonas Bayou
(74) *Attorney, Agent, or Firm* — Finnegan, Henderson, Farabow, Garrett & Dunner, L.L.P.

(57) ABSTRACT

An authenticating unit authenticates an external terminal and stores the result of authentication in an authentication state table. A receiving unit receives a first message containing information relating to a first application and identification information unique to the external terminal. A determining unit determines whether the external terminal contained in the first message is authentic by referring to the information in the authentication state table, each time the first message is received. A generating unit generates a second message containing a port, which is to be used by the first application, and an address of the external terminal when the external terminal is determined to be authentic. A transmitting unit transmits the second message to a firewall.

15 Claims, 10 Drawing Sheets

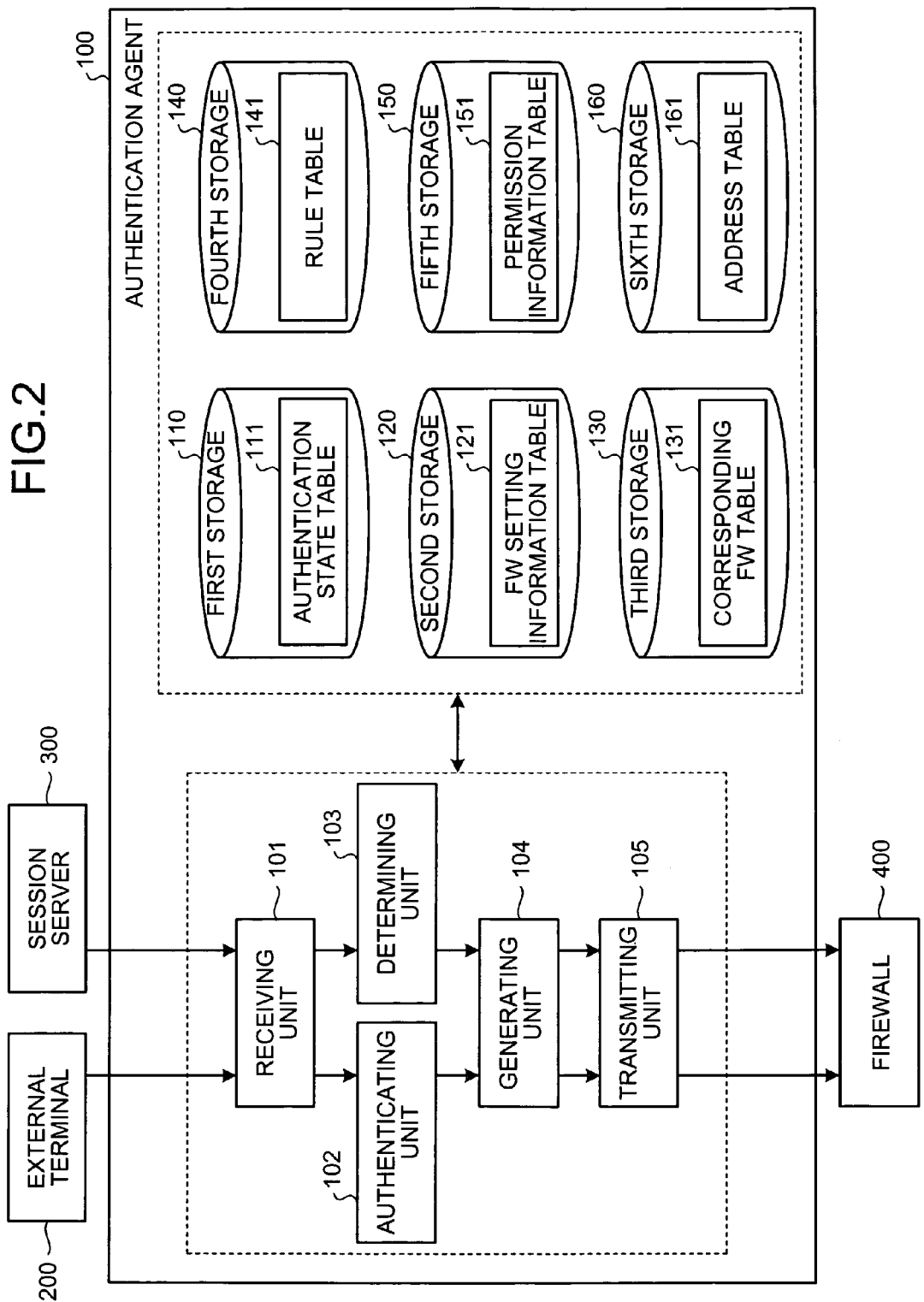

FIG.3

| AUTHENTICATION ID | ACCESS AUTHENTICATION STATE |
|---|---|
| tani@tani.org | YES |
| yama@tani.org | NO |
| kawa@kawa.org | YES |

| FWID | IP ADDRESS | MAKER/MODEL NAME | CONTROL TRANSPORT | CONTROL FORMAT |
|---|---|---|---|---|
| FW-A | 192.168.0.201 | A-SERIES PRODUCED BY X COMPANY | SNMP v3 | X COMPANY-SPECIFIC FORMAT |
| FW-B | 192.168.0.202 | B-SERIES PRODUCED BY Y COMPANY | Y COMPANY-SPECIFIC PROTOCOL | XML |

| AUTHENTICATION ID | CORRESPONDING FWID | |
|---|---|---|
| | FW-A | FW-B |
| tani@tani.org | YES | NO |
| yama@tani.org | YES | YES |
| kawa@kawa.org | NO | YES |

| APPLICATION PERMITTED | PERMISSION-CAPABLE APPLICATION |
|---|---|
| SIP | RTP |
| SIP | ssh |
| RTP | ssh |

| AUTHENTICATION ID | APPLICATION PERMITTED AND PORT NUMBER | | | |
|---|---|---|---|---|
| | SIP | RTP | ssh | ... |
| tani@tani.org | 5060 | - | - | ... |
| yama@tani.org | - | - | - | ... |
| kawa@kawa.org | 5060 | 2234, 2235, ... | 22 | ... |

| AUTHENTICATION ID | IP ADDRESS |
|---|---|
| tani@tani.org | 10.0.0.5 |
| yama@tani.org | 10.10.0.9 |
| kawa@kawa.org | 192.168.10.3 |

APPARATUS AND METHOD FOR CONTROLLING COMMUNICATION THROUGH FIREWALL, AND COMPUTER PROGRAM PRODUCT

CROSS-REFERENCE TO RELATED APPLICATIONS

This application is based upon and claims the benefit of priority from the prior Japanese Patent Application No. 2006-175688, filed on Jun. 26, 2006; the entire contents of which are incorporated herein by reference.

BACKGROUND OF THE INVENTION

1. Field of the Invention

The present invention generally relates to an apparatus and method for controlling a firewall, and a computer program product.

2. Description of the Related Art

Session Border Controllers (SBC) have appeared in the market. An SBC is a device that works on an internal network connected to the Internet through a firewall. In reality, the SBC represents a group of devices that include a session server that performs session control by using a session control protocol, and a firewall that is controlled by the session server.

The session server decides whether a new session needs to be established through the firewall from the result of execution of the session control protocol. When a new session needs to be established, the session server identifies an address and a port number to be used for the new session based on the result of the execution, and changes the setting of the firewall to permit the passage of the new session. Thus, the setting of the firewall are changed from an external device.

Such a technology for changing the settings of the firewall from an external device has been widely used. For example, US-A 2003/0142681 teaches to first perform the network-access authentication and then set a different value as Quality of Service (QoS) parameter of the firewall depending on the result of the authentication.

On the other hand, a device called an authentication agent has become available. Such an authentication agent performs network-access authentication, i.e., decides whether communication between an internal network and an external network is to be permitted. The authentication agent can be included in the SBC. When the authentication agent is included in the SBC, the authentication agent first authenticates an external terminal, and then the authenticated external terminal performs negotiation on session used for data communication with a communication target terminal through a session server, and decides a port number for use. Finally, the session server changes the setting of a firewall so that communication can be performed through the port with the port number decided by the negotiation.

In the conventional technology, however, security is not fully ensured at the time of start of data session after establishment of the communication. That is, in the conventional technology, when an external terminal starts a new data session by using a session control protocol permitted in the network-access authentication, the session server controls the firewall without checking the result of previously performed network-access authentication.

Therefore, it cannot be verified whether data session is established by an external terminal that is authenticated by the network access authentication, i.e., permitted to perform network access, and hence, the setting of the firewall can be disadvantageously changed even for an external terminal that is not authentic.

SUMMARY OF THE INVENTION

According to an aspect of the present invention, a communication control apparatus controlling communication through a firewall between an internal device connected to an internal network and an external device connected to an external network, includes an authenticating unit configured to perform authentication of the external device to decide whether the external device is authentic and to create authentication information indicative of whether the external device is authentic; a first storage unit configured to store therein the authentication information associated with first identification information unique to the external device; a receiving unit configured to receive, from a server device that establishes communication between the external device and the internal device, a first message containing information about a first application used for communication between the external device and the internal device, and the first identification information; a determining unit configured to determine whether the external device is authentic based on the first identification information contained in the first message and the authentication information stored in the first storage unit; a generating unit configured to generate a second message to set a first port in the firewall, when the determining unit determines that the external device is authentic, the first port being a port used for communication between the external device and the internal device using the first application; and a transmitting unit configured to transmit the second message generated by the generating unit to the firewall.

According to another aspect of the present invention, a method of controlling communication through a firewall between an internal device connected to an internal network and an external device connected to an external network, includes performing authentication of the external device to decide whether the external device is authentic; creating authentication information indicative of whether the external device is authentic; storing the authentication information associated with first identification information unique to the external device in a first storage unit; receiving, from a server device that establishes communication between the external device and the internal device, a first message containing information about a first application used for communication between the external device and the internal device, and the first identification information; determining whether the external device is authentic based on the first identification information contained in the first message and the authentication information stored in the first storage unit; generating, when it is determined at the determining that the external device is authentic, a second message to set a first port in the firewall, the first port being a port used for communication between the external device and the internal device by using the first application; and transmitting the second message generated at the generating to the firewall.

According to another aspect of the present invention, a computer program product having a computer-readable recording medium containing a plurality of computer-executable instructions to execute a method of controlling communication through a firewall between an internal device connected to an internal network and an external device connected to an external network, and causing a computer to execute the plurality of instructions comprising performing authentication of the external device to decide whether the external device is authentic; creating authentication information indicative of whether the external device is authentic; storing the authentication information associated with first identification information unique to the external device in a first storage unit; receiving, from a server device that establishes communication between the external device and the internal device, a first message containing information about a first application used for communication between the external device and the internal device, and the first identification information; determining whether the external device is authentic based on the first identification information contained in the first message and the authentication information stored in the first storage unit; generating, when it is determined at the determining that the external device is authentic, a second message to set a first port in the firewall, the first port being a port used for communication between the external device and the internal device by using the first application; and transmitting the second message generated at the generating to the firewall.

BRIEF DESCRIPTION OF THE DRAWINGS

FIG. 2 is a detailed block diagram of a communication control apparatus according to the embodiment;

FIG. 3 is a schematic of an example of the contents of an authentication state table shown in FIG. 2;

FIG. 4 is a schematic of an example of the contents of a FW setting information table shown in FIG. 2;

FIG. 5 is a schematic of an example of the contents of a corresponding FW table shown in FIG. 2;

FIG. 6 is a schematic of an example of the contents of a rule table shown in FIG. 2;

FIG. 7 is a schematic of an example of the contents of a permission information table shown in FIG. 2;

FIG. 8 is a schematic of an example of the contents of an address table shown in FIG. 2;

DETAILED DESCRIPTION OF THE INVENTION

Exemplary embodiments of the present invention are explained in detail below with reference to the accompanying drawings.

Assume that data communication is to be permitted between an external terminal, which is on an external network outside a firewall, and a communication target terminal, which is on an internal network inside the firewall. A communication control apparatus according to an embodiment of the present invention verifies the result of network-access authentication of the external terminal, and decides whether to permit the communication.

The communication control apparatus integrally manages information required for setting of the firewall, decides whether to permit the communication that has been requested by a session server, and controls the setting of the firewall based on the decision.

Furthermore, the communication control apparatus determines whether to permit an application, for which the communication control apparatus newly receives a permission, by referring to information on applications that have been already permitted.

Figure 1:
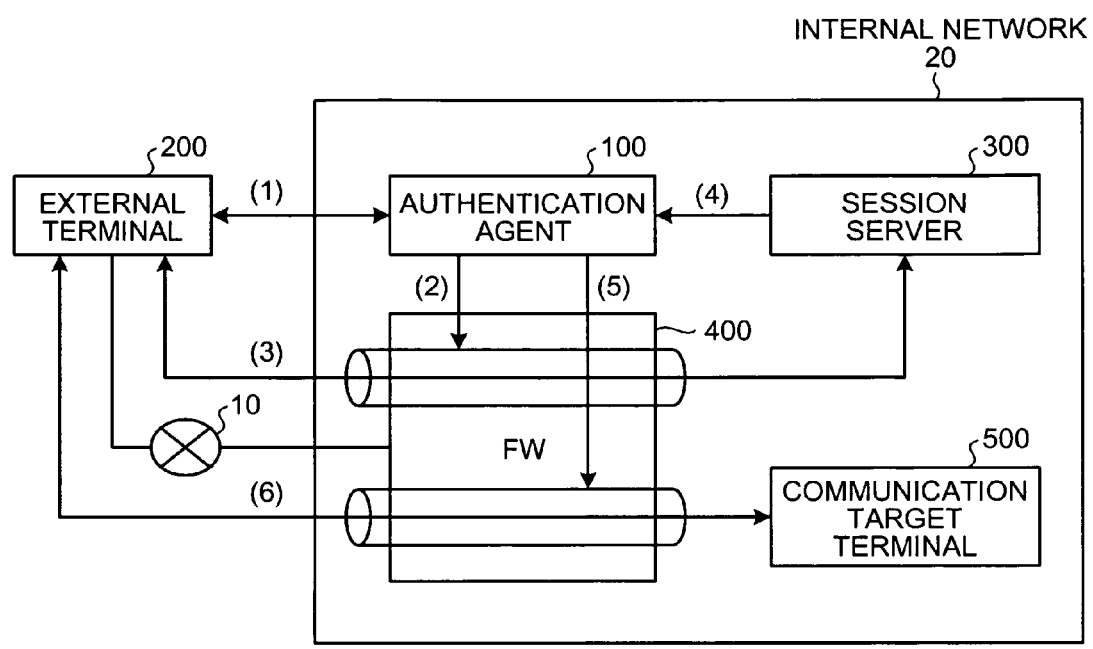
FIG. 1 is a schematic of a system according to an embodiment of the present invention.

As shown in FIG. 1, a system according to an embodiment of the present invention includes an external network 10 and an internal network 20 that are connected to each other. An external terminal 200 is connected to the external network 10. The internal network 20 includes a firewall (FW) 400, an authentication agent 100 which is the communication control apparatus, a session server 300, and a communication target terminal 500. The authentication agent 100, the session server 300, and the communication target terminal 500 in the internal network 20 are connected to the external network 10 through the FW 400. In other words, the internal network 20 is protected by the FW 400.

The system is applicable to an enterprise Voice over Internet Protocol (VoIP) system and the like.

The external terminal 200 can be a mobile computer capable of performing data communication by using session control protocol that is based on Session Initiation Protocol (SIP). However, the session control protocol is not limited to the SIP, i.e., some other protocol.

To perform network-access authentication, the external terminal 200 operates as a client of Protocol for carrying Authentication for Network Access (PANA), which is a network access authentication protocol. Uniform Resource Identifier (URI) can be used as authentication ID which is used for network-access authentication. The authentication ID is not only used for the network-access authentication but also transmitted in a message used for session control. Various protocols can be used for performing data communication after communication is established by the session control. For example, Real-time Transport Protocol (RTP) can be used.

The internal network 20 can correspond to a network in one domain managed by an organization. A firewall generally exists at the border between two networks; however, for the sake of simplicity the FW 400 is shown inside the internal network 20 in FIG. 1. Out of the authentication agent 100, the session server 300, and the communication target terminal 500 in the internal network 20, two or more can be realized on the same computer. Furthermore, the session server 300 and the communication target terminal 500 can be provided in plurality in the internal network 20. Moreover, the FW 400 can be provided in plurality at the border between the internal network 20 and the external network 10.

The session server 300 is a server device that uses the SIP to provide session control for data communication between terminals. More specifically, the session server 300 provides session control for data communication between the external terminal 200 and the communication target terminal 500.

The external terminal 200 and the communication target terminal 500 use the SIP to perform negotiation on the session used for mutually performing data communication through the session server 300. When performing such a negotiation, the session server 300 identifies an application protocol (hereinafter, "application") name used for data communication, and also identifies a port number to be used.

The communication target terminal 500 is the other party with which the external terminal 200 performs communication. The communication target terminal 500 provides session control for the external terminal 200 through the session server 300. The communication target terminal 500 can use any protocol such as the SIP and the RTP for performing data communication with the external terminal 200. It is possible to have a structure in which the authentication agent 100 authenticates the communication target terminal 500, in the same manner as the authentication agent 100 authenticates the external terminal 200.

The FW 400 controls, i.e., allows or prevents, communications between the internal network 20 and the external network 10. Specifically, if a pair of an IP address and a port number of the external terminal 200 are set in the FW 400, only then the FW 400 permits communications between the external terminal 200 with a device in the internal network 20 by using preset application.

The authentication agent 100 sends a message to the FW 400 in a specific data format by using a specific transport protocol, such as Simple Network Management Protocol Version 3 (SNMPv3). Such a message contains a pair of IP address and port number of an external terminal and information indicative of whether communications with/from the external terminal is to be permitted. When the FW 400 receives such a message, it sets the IP address and port number if communications with/from the external terminal is to be permitted, or deletes the already set IP address and port number if communications with/from the external terminal is not to be permitted.

The authentication agent 100 is a device that operates as an authentication agent based on an authentication protocol. Spherically, the authentication agent 100 executes a network-access authentication process with respect to the external terminal 200 to decide whether to permit network access to the external terminal 200. The authentication protocol of the authentication agent 100 can be the PANA, or the Authentication, Authorization, and Accounting (AAA) protocol. The AAA protocol includes a Remote Authentication Dial-In User Service (RADIUS) protocol used by an authentication server (not shown) existing on the internal network.

The authentication agent 100 even performs processes other than the network-access authentication process. For example, if the authentication agent 100 receives a control request message from the session server 300 in a particular data format to control the FW 400, the authentication agent 100 first verifies the legitimacy of the control request message, and if the control request message is legitimate, transmits a control message to the FW 400 to control the FW 400.

The overview of the processing procedure performed by the system shown in FIG. 1 is explained below. The processing procedure is performed in the following order, and the numbers in the parentheses correspond to those shown in FIG. 1.

(1) The external terminal 200 requests network-access authentication to the authentication agent 100, and the authentication agent 100 performs the network-access authentication process to decide whether the external terminal 200 is authentic. It is assumed here that the external terminal 200 is authentic.

(2) The authentication agent 100 requests the FW 400 to permit use of a port for communication between the authentic external terminal 200 and the session server 300 based on the session control protocol. The FW 400 permits use of the port. On the other hand, the session server 300 relays a message so that negotiation is performed between the external terminal 200 and the communication target terminal 500.

(3) Negotiation is executed between the external terminal 200 and the session server 300 via the permitted port to start a session for the communication target terminal 500.

(4) If negotiation is successful, the session server 300 transmits a request to the authentication agent 100 to permit use of a port for data communication between the external terminal 200 and the communication target terminal 500.

(5) The authentication agent 100 transmits a request to the FW 400 to permit use of a port for data communication between the external terminal 200 and the communication target terminal 500. The FW 400 permits use of the port.

(6) Data communication can be started between the external terminal 200 and the communication target terminal 500.

The authentication agent 100 includes a first storage 110, a second storage 120, a third storage 130, a fourth storage 140, a fifth storage 150, a sixth storage 160, a receiving unit 101, an authenticating unit 102, a determining unit 103, a generating unit 104, and a transmitting unit 105.

The first storage 110 stores therein an authentication state table 111 that contains the results of the authentication performed by the authentication agent 100. The determining unit 103 refers to the authentication state table 111 when it decides whether to permit access to the external terminal 200.

As shown in FIG. 3, the authentication state table 111 contains authentication IDs of external terminals, and access authentication state that indicates whether to permit access of a particulate external terminal. The access authentication state is set to YES when permitting the access, and set to NO when not permitting the access.

The second storage 120 stores therein a FW setting information table 121. The second storage 120 contains setting information that has been in the FW 400. The generating unit 104 refers to the FW setting information table 121 when it generates a control message for transmitting to the FW 400. If plural firewalls exist between the external network 10 and the internal network 20, then the FW setting information table 121 contains setting information of all the firewalls.

As shown in FIG. 4, the FW setting information table 121 contains a FW-ID, which is a unique identifier of the FW 400, an IP address, a maker and model name, a control transport indicating a type of transport protocol used for control, and a control format indicating a message format used for control for the FW 400. However, the setting information is not limited thereto, that is, the setting information can be any information that is required for controlling the FW 400.

The third storage 130 stores therein a corresponding FW table 131. The corresponding FW table 131 contains information on the external terminal 200 and the FW 400 that corresponds with the external terminal 200. If there are plural external terminals and plural firewalls, then the corresponding FW table 131 contains information on all the external terminals and corresponding firewalls.

Specifically, as shown in FIG. 5, the corresponding FW table 131 contains an authentication ID of each external terminal and a FWID of a corresponding firewall. The example shown in FIG. 5 contains three authentication IDs, and two FWIDs. A corresponding firewall is a firewall that is used when the external terminal 200 performs communication with a device inside the internal network 20.

In FIG. 5, YES means a firewall corresponds to the corresponding external terminal, NO means a firewall does not correspond to the corresponding external terminal. For example, firewall FW-A corresponds to an external terminal having an authentication ID tani@tani.org, while firewall FW-B does not correspond to the external terminal having the authentication ID tani@tani.org.

A corresponding FW that corresponds to an authentic external terminal can be identified from the IP address of the external terminal 200 acquired from an authentication request message upon network-access authentication, and also based on routing information previously determined, to set the corresponding FW 400 in the corresponding FW table 131.

The fourth storage 140 stores therein a rule table 141. The rule table 141 contains a list of permitted applications and permission-capable applications corresponding to each of the permitted application. A permitted application is an application that is executed on the communication target terminal 500 by the external terminal 200. A permission-capable application is an application that is executed on the communication target terminal 500, and that can be executed only if it is executed after the execution of the corresponding permitted application. The determining unit 103 refers to the rule table 141 to determine whether an application is a permitted application or a permission-capable application.

In the example shown in FIG. 6, the SIP is a permitted application, while the RTP and Secure SHell (ssh) are permission-capable application of the SIP.

The fifth storage 150 stores therein a permission information table 151. The permission information table 151 contains information on a port number that is to be used for a combination of a permitted application and an external terminal. The determining unit 103 refers to the permission information table 151, along with the rule table 141, to determine whether an application is a permitted application.

In the example shown in FIG. 7, a port with a port number 5060 is used when the SIP executed at an external terminal with an authentication ID tani@tani.com accesses the communication target terminal 500.

The sixth storage 160 stores therein an address table 161. The address table 161 contains IP addresses of all the external terminals. The generating unit 104 retrieves an IP address of an external terminal from the address table 161, and includes that IP address in a control message.

In the example shown in FIG. 8, An external terminal with an authentication ID tani@tani.com has an IP address 10.0.0.5.

The receiving unit 101 receives an authentication request message from the external terminal 200. The authentication request message contains information such as an authentication ID, a password, and an IP address of the external terminal 200, each of which is used for authentication. The receiving unit 101 receives the information according to the specification of the PANA which is the authentication protocol.

The receiving unit 101 also receives a control request message from the session server 300. The control request message contains information indicative of a port through which communication is permitted, the communication being on application for which negotiation is completed between the external terminal 200 and the communication target terminal 500.

Figure 9:
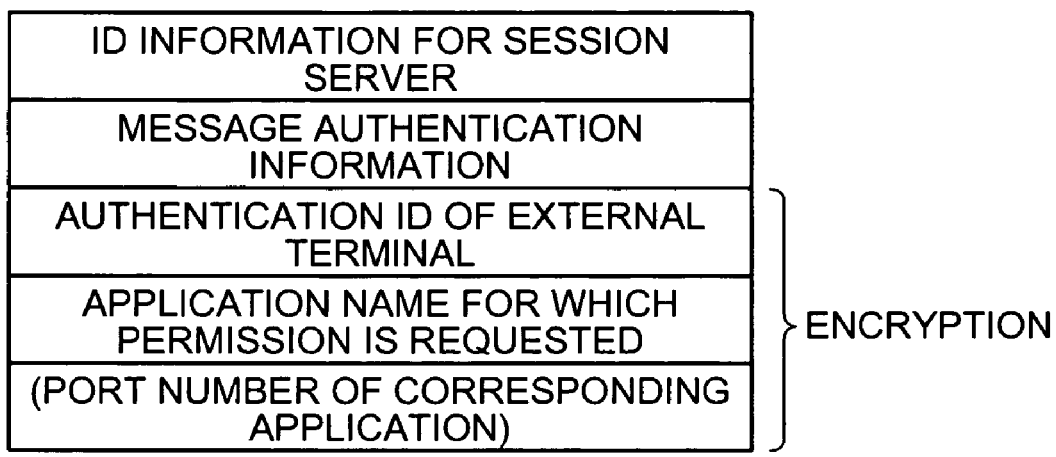
FIG. 9 is a schematic of an example of the contents of a control request message.

As shown in FIG. 9, the control request message contains ID information about the session server 300, message authentication information used for message authentication of the session server 300, an authentication ID of the external terminal 200, an application name for which permission is requested, and a port number used by the application. However, the setting of the port number is not essential.

The authenticating unit 102 executes a network-access authentication process with respect to the external terminal 200 by using the PANA which is the authentication protocol, according to the authentication request message received from the external terminal 200. The authentication protocol is not limited to the PANA. If a different authentication protocol is used, however, the authenticating unit 102 executes the network-access authentication process according to that authentication protocol.

The determining unit 103 determines, when receiving the authentication request message from the session server 300, whether the external terminal 200 from which the request is sent is authentic and determines whether the application requested can be permitted, by referring to the authentication state table 111, the rule table 141, and the permission information table 151.

When the authenticating unit 102 succeeds in authentication, the generating unit 104 generates a control message to permit communication based on the SIP between the authentic external terminal 200 and the session server 300.

When the determining unit 103 determines that the external terminal 200 from which the request is sent is authentic and the application requested can be permitted, the generating unit 104 generates a control message to permit communication based on the application requested.

Figure 10:
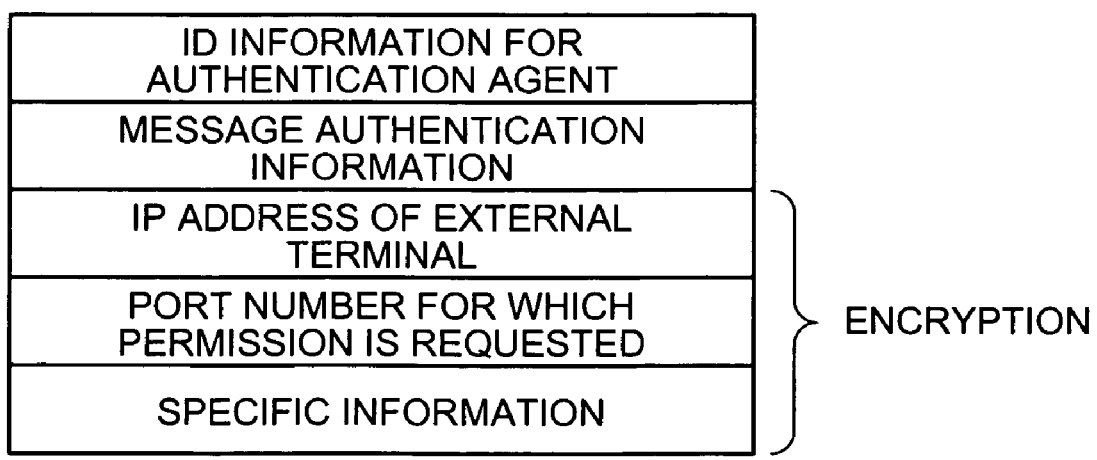
FIG. 10 is a schematic of an example of the contents of a control message.

As shown in FIG. 10, the control message contains ID information about the authentication agent 100, message authentication information used by the authentication agent 100 to authenticate the message, an IP address of the external terminal 200, a port number for which permission is requested, and specific information about the FW 400 such as time limit for permission.

The IP address of the external terminal, the port number for which permission is requested, and the specific information in the control message is encrypted information. However, the control message may be generated without encrypting these pieces of information.

The transmitting unit 105 transmits the control message to the FW 400. The transmitting unit 105 also transmits a response message with respect to the authentication request message that is received from the external terminal 200, to the external terminal 200. The transmitting unit 105 transmits the response message according to the specification of the PANA, which is the authentication protocol.

Figure 11:
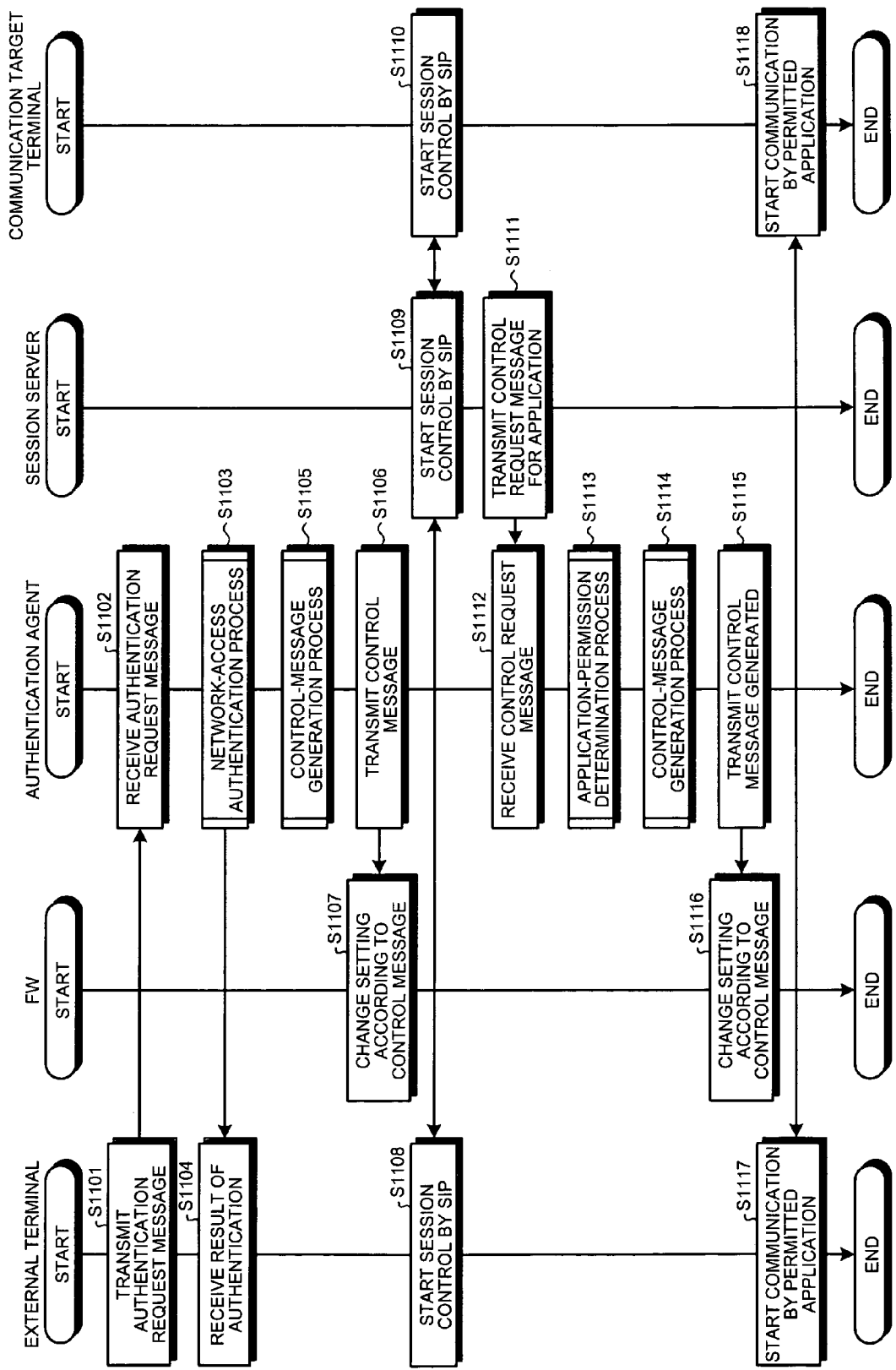
FIG. 11 is a sequence diagram of a communication control process according to the embodiment.

The communication control process executed by the authentication agent 100. FIG. 11 is a sequence diagram of processes executed before the external terminal 200 starts communication with the communication target terminal 500.

It has been assumed that, before performing the processes shown in FIG. 11, the authentication agent 100 acquires information relating to the FW 400 by a management protocol such as a Simple Network Management Protocol (SNMP), and stores the information in the FW setting information table 121. Alternatively, an administrator can set the information relating to the FW 400 in the FW setting information table 121.

The authentication agent 100 also acquires information about a state of connecting with the external network 10, such as information relating to routing. Furthermore, the trust relationship may also be previously established between the FW 400 or the session server 300 and the authentication agent 100 as necessary, using password information or the like.

First, the external terminal 200 transmits an authentication request message to the authentication agent 100 by using the address, which is previously acquired, of the authentication agent 100 (step S1101). The external terminal 200 uses the PANA protocol as a network-access authentication protocol to transmit the authentication request message to the internal network 20.

An entity to be authenticated can be the external terminal 200 itself, the user who uses the external terminal 200, or both. In the embodiment, a URI is used as the authentication ID. For example, the authentication ID of the external terminal 200 is specified with a URI such as "tani@tani.org".

The receiving unit 101 of the authentication agent 100 receives the authentication request message from the external terminal 200 (step S1102).

Then, the authenticating unit 102 executes the network-access authentication process with respect to the external terminal 200 (step S1103). The network-access authentication process is explained later with reference to FIG. 12. The result of the network-access authentication process transmitted from the authentication agent 100 is received by the external terminal 200 (step S1104) The external terminal 200 receives the result of the network-access authentication process from the authentication agent 100 (step S1104).

When the authentication is successful, the transmitting unit 105 executes a control-message generation process for generating a control message to set permission of communication using the SIP between the external terminal 200 and the session server 300 (step S1105). The control-message generation process is explained later with reference to FIG. 13. If the authentication is unsuccessful, the control-message generation process and the processes thereafter are not executed, although such a loop is not shown in FIG. 11.

Next, the transmitting unit 105 transmits the control message to the FW 400 (step S1106). More specifically, the transmitting unit 105 transmits the control message by the transport protocol acquired in the control-message generation process, using the IP address of the FW 400 acquired in the control-message generation process as a destination address.

The FW 400 receives the control message and changes the setting of an application and a port to be permitted according to the control message received (step S1107). More specifically, first, the FW 400 ascertains that the control message is the one sent from the authentication agent 100 with which the trust relationship is established, using the ID information of the authentication agent 100 and the message authentication information contained in the message. Then, the FW 400 decrypts the message with a corresponding key previously held. Thereafter, the FW 400 changes the setting so as to permit communication from the outside using the IP address information and the port number specified.

Because the change of the setting allows the communication using the SIP, the external terminal 200 starts session control for the session server 300 to establish a data communication session with the communication target terminal 500 (steps S1108 and S1109).

The session server 300 executes the session control through processes such that the message received from the external terminal 200 is transferred to the communication target terminal 500 (step S1110). During those processes, as an ID used for session control, the external terminal 200 uses the same ID as the authentication ID used for the network-access-authentication performed by the authentication agent 100. The URI, such as "tani@tani.org", can be used as the ID.

The negotiation on the protocol and format for the data communication for use between the external terminal 200 and the communication target terminal 500 is completed based on the session control protocol. During this process, the session server 300 transferring the message can also identify the authentication ID of the external terminal 200 with which the negotiation is completed, the application name to be used, and the port number to be used if possible, by referring to the message transferred.

The session server 300 can also identify the IP address of the external terminal 200, but in a system that uses Network Address Translation (NAT), it is not ensured whether the IP address information, which can be identified by the session server 300 existing inside the internal network 20, is useful for control of the FW 400.

The application name used for communication by the external terminal 200 and the communication target terminal 500, and the port number if it can be used are decided at this time. However, because the FW 400 does not permit the external terminal 200 to use the port for the application, the external terminal 200 and the communication target terminal 500 cannot perform data communication using the application.

To take care of this issue, the session server 300 is configured to transmit the control request message requesting the change of setting of the FW 400 for the application, to the authentication agent 100 with which the trust relation is previously established (step S1111).

More specifically, the session server 300 generates a control request message in which the following pieces of information are set. The information includes the ID information of the session server 300, the message authentication information used for message authentication, the authentication ID of the external terminal 200 identified upon session control, the application name for which permission is requested, and the port number used by the application if possible. The session server 300 transmits the control request message generated to the authentication agent 100.

For example, "tani@tani.org" as the authentication ID of the external terminal 200, "RTP" as the application name for which permission is requested, and "1234" as the port number used by the application are set in the control request message, and this control request message is transmitted.

In this manner, the session server 300 does not directly change the setting of the FW 400 unlike the conventional SBC, but can request the change of setting of the FW 400 from the authentication agent 100. Therefore, the session server 300 does not need to hold the setting information of the FW 400 required for changing the setting, nor does it need to hold the trust relationship with the FW 400.

The communication target terminal 500 can be configured to transmit the control request message to the authentication agent 100 instead of the session server 300 that transmits the control request message thereto. When such a configuration is employed, the trust relationship needs to be previously established between the communication target terminal 500 and the authentication agent 100.

Then, the receiving unit 101 of the authentication agent 100 receives the control request message (step S1112). Subsequently, by referring to the control request message received, the determining unit 103 executes the application-permission determination process for determining whether the communication is permitted between the external terminal 200 and the communication target terminal 500 using the application for which negotiation is completed (step S1113). The detail of the application-permission determination process is explained later.

When it is determined that the application can be permitted, the generating unit 104 executes the control-message generation process for generating the control message so as to set permission of communication by the application which is determined as permission-capable one (step S1114). The control-message generation process is the same process as that at step S1105. The detail of the control-message generation process is explained later.

The transmitting unit 105 transmits the control message generated to the FW 400 (step S1115).

The FW 400 receives the control message transmitted and changes the setting of the application and port which are permitted, according to the control message received (step S1116). This process is the same as that at step S1107.

Because the change of the setting allows communication by the application for which negotiation is completed, the external terminal 200 starts communication with the communication target terminal 500 using the application (steps S1117 and S1118). In the example explained above, the external terminal 200 can perform communication with the communication target terminal 500 based on the RTP using the port of the port number 1234.

Figure 12:
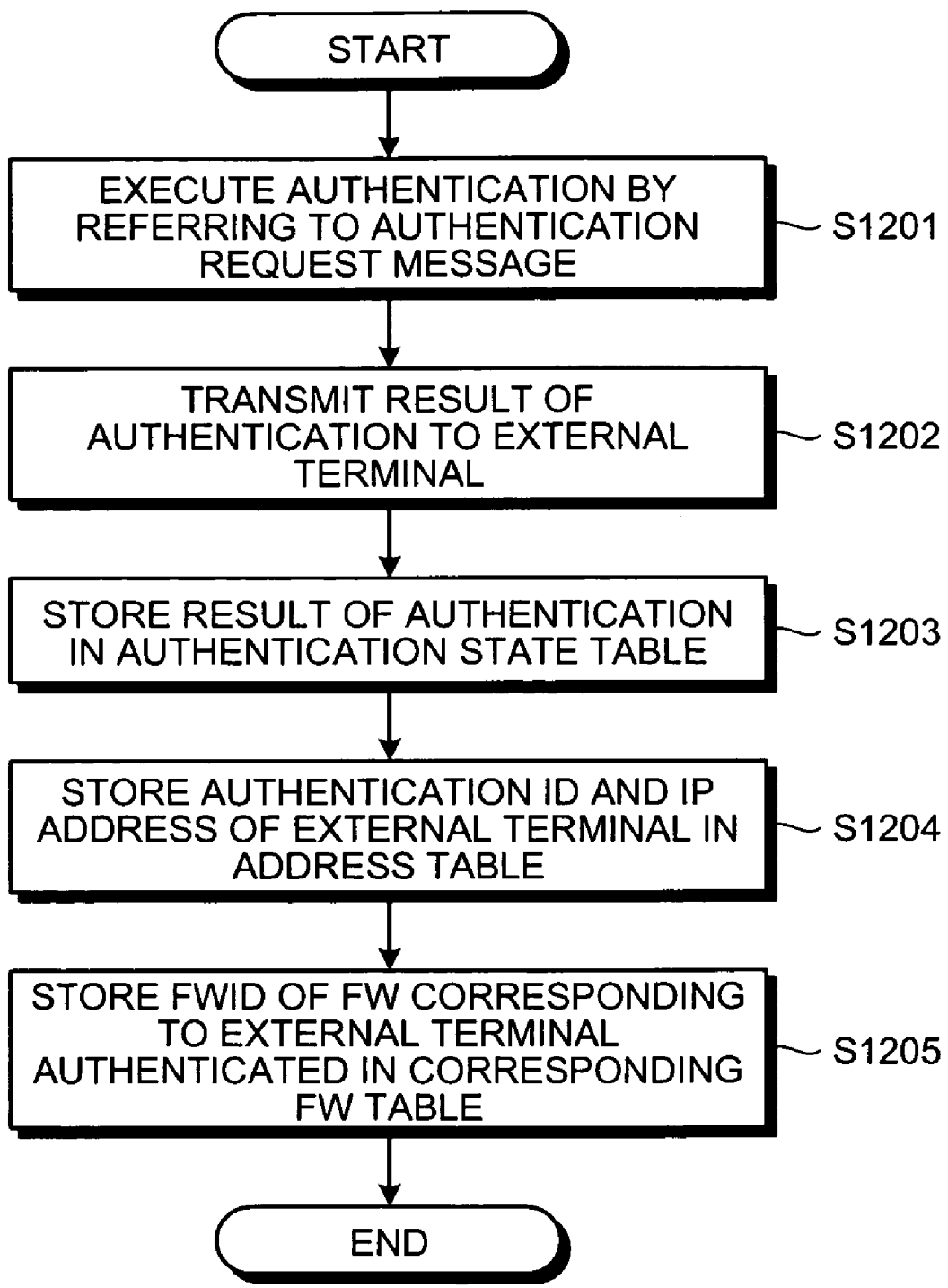
FIG. 12 is a flowchart of a network-access authentication process according to the embodiment.

The network-access authentication process is explained below with reference to FIG. 12. First, the authenticating unit 102 performs authentication by referring to the authentication request message (step S1201). More specifically, the authenticating unit 102 acquires information required for authentication such as the authentication ID and password contained in the authentication request message, and performs network-access authentication so that the external terminal 200 can access the internal network 20.

Then, the authenticating unit 102 transmits the result of authentication to the external terminal 200 (step S1202), and stores the result in the authentication state table 111 (step S1203).

More specifically, the authenticating unit 102 adds the authentication ID of the external terminal 200 authenticated to the authentication state table 111, and sets the network-access authentication state to be in the permission state, i.e., YES. For example, as shown in FIG. 3, the authenticating unit 102 changes the access authentication state of the authentication ID="tani@tani.org" to YES.

Further, the authenticating unit 102 adds the authentication ID and IP address of the external terminal 200 acquired from the authentication request message to the address table 161 (step S1204). If the authentication ID is already registered in the address table 161, the authenticating unit 102 updates the corresponding IP address.

The authenticating unit 102 identifies a FWID of the FW 400 that needs control when the external terminal 200 is permitted to perform data communication using the application, from the IP address of the external terminal 200 and the routing information in the system, and stores the FWID identified in the corresponding FW table 131 (step S1205). For example, if the FWID of the FW 400, which corresponds to the external terminal 200 whose authentication ID is "tani@tani.org", is "FW-A", the authenticating unit 102 sets YES for "FW-A" as shown in FIG. 5.

In the embodiment, to enable referring to pieces of information as follows in the setting process of the FW 400 executed after authentication, the pieces of information such as the result of authentication, the IP address, and the corresponding FW 400 are stored in the respective tables in the network-access authentication process.

Figure 13:
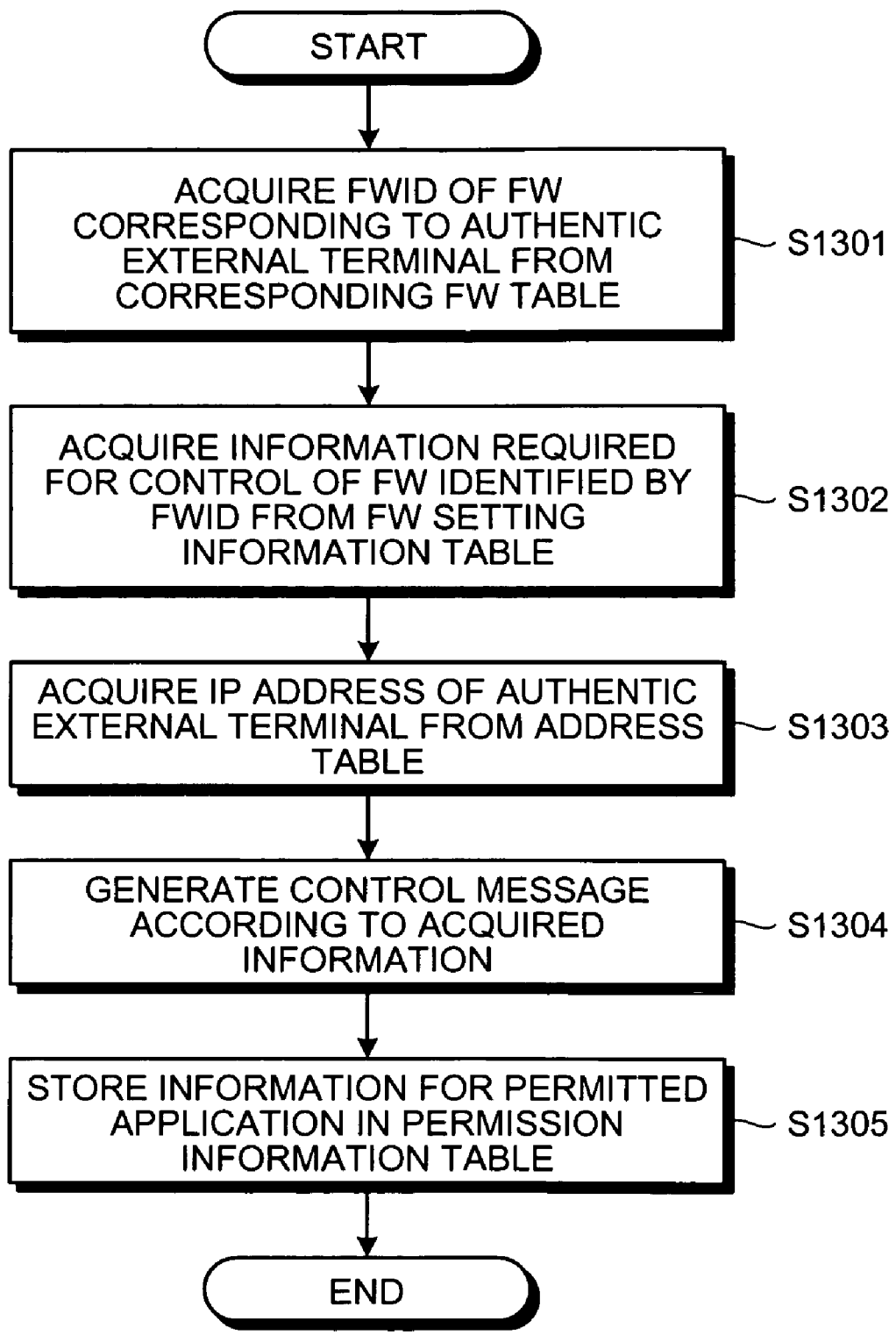
FIG. 13 is a flowchart of a control-message generation process according to the embodiment.

The control-message generation process is explained below with reference to FIG. 13. First, the generating unit 104 acquires the FW 400 corresponding to an authentic external terminal 200 from the corresponding FW table 131 (step S1301). For example, when the information as shown in FIG. 5 is stored in the corresponding FW table 131, the generating unit 104 acquires "FW-A" being the FWID of the FW 400 corresponding to the external terminal 200 whose authentication ID is "tani@tani.org".

Then, the generating unit 104 acquires information required for control of the FW 400 identified from the acquired FWID, from the FW setting information table 121 (step S1302). For example, when the setting information as shown in FIG. 4 is stored in the FW setting information table 121, the generating unit 104 acquires information such as the IP address="192.168.0.201", the control protocol="SNMPv3", and the control format="X company-specific format", which are the setting information of the FW 400 whose FWID is "FW-A".

The generating unit 104 acquires the IP address of the authentic external terminal 200 from the address table 161 (step S1303). For example, when the information as shown in FIG. 8 is stored in the address table 161, the generating unit 104 acquires "10.0.0.5" as the IP address when the authentication ID of the external terminal 200 is "tani@tani.org".

The generating unit 104 generates a control message according to the information acquired at the previous steps (step S1304). More specifically, the generating unit 104 generates a control message in the control format acquired from the FW setting information table 121. The control message contains the ID information of the authentication agent 100, the message authentication information used for authentication performed by the FW 400, the IP address of the external terminal 200, the port number for which permission is requested, and other information specific to the FW 400.

With these processes, the generating unit 104 can generate the control message so that the FW 400 whose FWID is "FW-A" permits the authentic external terminal 200 to perform communication with the communication target terminal 500 using the permitted port.

As for the port number for which permission is requested, the generating unit 104 decides a value preset according to the application, and sets the value in the control message. For example, when permission of the SIP is requested, "5060" is set therein as the port number.

When the control-message generation process is called at step S1114, the port number contained in the control request message can be set as the port number for which permission is requested. In other words, when the session server 300 sets the port number and transmits the control request message, the port number contained in the control request message is set, as it is, as the port number for the control message to be transmitted to the FW 400.

The generating unit 104 stores the information on the application permitted by the control message in the permission information table 151 (step S1305). For example, when the SIP is permitted and the port number used by the SIP is "5060", "5060" is set in a column corresponding to the SIP of "tani@tani.org" as the authentication ID as shown in FIG. 7. In this case, the setting may also be performed after an acknowledgement message corresponding to the message transmitted to the FW 400 is received therefrom.

As explained above, the embodiment is configured to generate the control message used for controlling the FW 400 in the authentication agent 100. Therefore, the session server 300 does not need to directly change the setting of the FW 400 unlike the conventional SBC, nor does it need to hold the setting information of individual FWs 400.

Moreover, the information regarding the permitted applications is stored in the permission information table 151. With this feature, it is possible to determine whether the application is permitted upon setting of the FW 400 to permit communication by the application.

Figure 14:
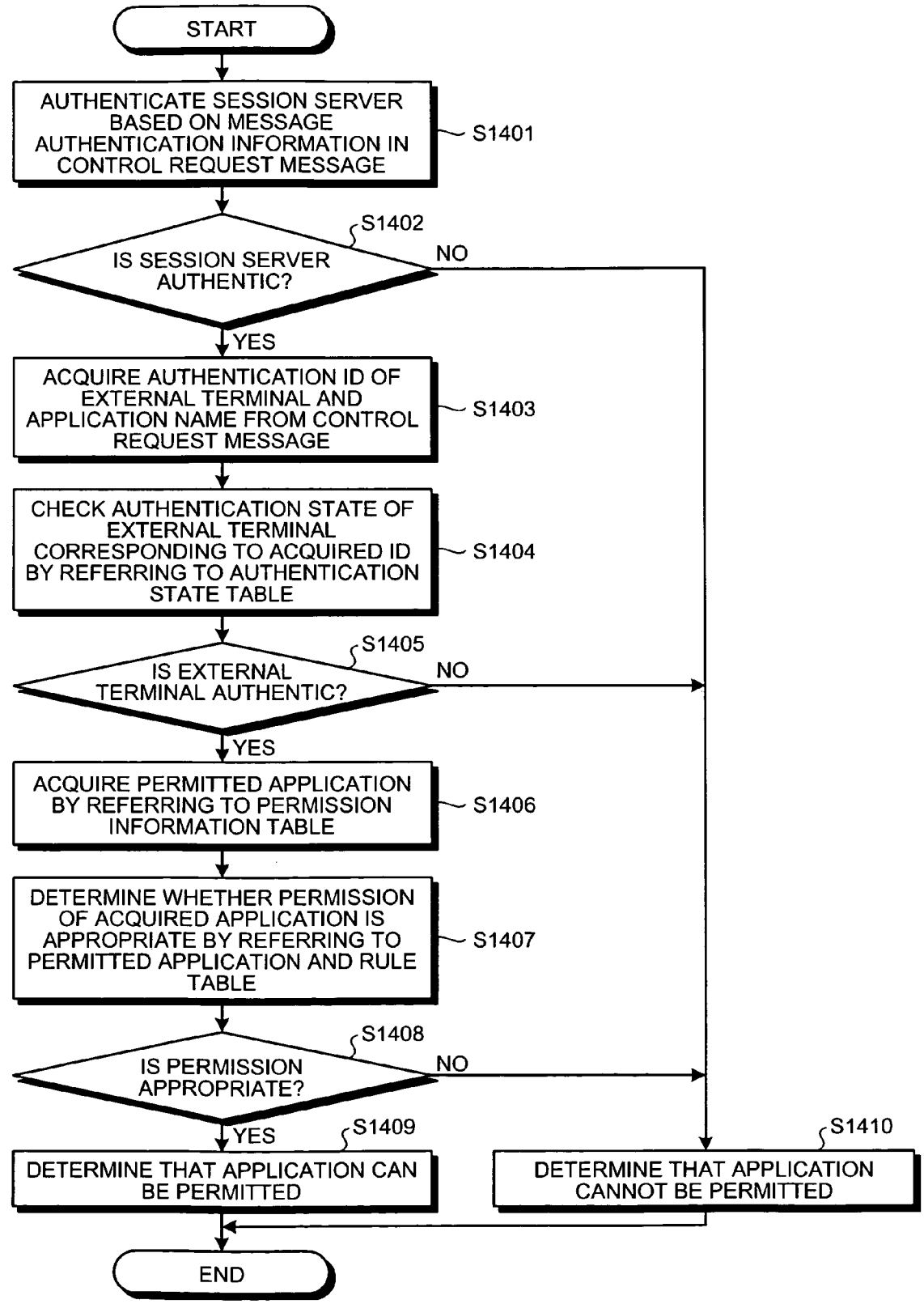
FIG. 14 is a flowchart of an application-permission determination process according to the embodiment.

The application-permission determination process is explained below with reference to FIG. 14. First, the determining unit 103 authenticates the session server based on the message authentication information in the control request message (step S1401). More specifically, the determining unit 103 acquires the ID information of the session server 300 and the message authentication information from the control request message, and verifies that the control request message is the one transmitted from the session server 300 with which the trust relationship is established, through the authentication process by referring to the information acquired.

Then, the determining unit 103 determines whether the session server 300 is authentic (step S1402). If it is authentic (Yes at step S1402), the determining unit 103 acquires the authentication ID and the application name of the external terminal 200 that made the request for permission of communication, from the control request message (step S1403).

More specifically, when the message is in an encrypted form, the determining unit 103 first decrypts the encrypted part in the control request message with a key previously acquired. Then, the determining unit 103 acquires an authentication ID of the external terminal 200, an application name, and a port number when it is set, for which permission is desired by the session server 300 being the source of the control request message, from the decrypted part.

It is assumed below that the determining unit 103 acquires, from the control request message, "tani@tani.org" as the authentication ID, "RTP" as the application name, and "1234" as the port number.

Next, the determining unit 103 ascertains the authentication state of the external terminal 200 corresponding to the authentication ID acquired by referring to the authentication state table 111 (step S1404). For example, if the information as shown in FIG. 3 is stored in the authentication state table 111, the authentication state of "tani@tani.org" as the authentication ID is YES, and this means that the external terminal 200 is authentic.

The determining unit 103 determines whether the relevant external terminal 200 is authentic (step S1405). If the relevant external terminal 200 is determined to be authentic (Yes at step S1405), the determining unit 103 acquires the permitted application by referring to the permission information table 151 (step S1406).

For example, if the permission information as shown in FIG. 7 is stored in the permission information table 151, the determining unit 103 can acquire the information that the SIP is permitted for the external terminal 200 whose authentication ID is "tani@tani.org".

Then, the determining unit 103 determines whether it is appropriate to permit the application which is acquired at step S1403 and for which permission is requested, by referring to the permitted application and the rule table 141 (step S1407).

For example, based on the rules in the rule table 141 as shown in FIG. 6, because the SIP is a permitted application, the determining unit 103 determines that it is appropriate to further permit the RTP.

When it is determined that the permission is appropriate (Yes at step S1408), the determining unit 103 determines that the application requested can be permitted (step S1409).

When it is determined that the permission is inappropriate (No at step S1408), when it is determined at step S1402 that the session server 300 is not authentic (No at step S1402), or when it is determined at step S1405 that the external terminal 200 is not authentic (No at step S1405), the determining unit 103 determines that the requested application cannot be permitted (step S1410).

As explained above, the authentication state is referred to each time the request to permit communication is sent to the FW 400, so that it becomes possible to prevent granting a permission to an application for the external terminal 200 that is not authentic. Furthermore, even if the external terminal 200 is authentic, permission of an application can be limited according to respective dependencies of a plurality of applications.

In this manner, the communication control apparatus can decide whether communication is permitted by always verifying the result of network-access authentication of the external terminal when data communication is to be permitted between the external terminal and the communication target terminal on the internal network. Further, by referring to the information about the application already permitted and the predetermined rules, it is possible to decide whether a new application can be used. This allows improvement in the security at the network border upon communication between the external terminal and the communication target terminal.

Moreover, the communication control apparatus can integrally manage the information required for setting of the firewall, and decide whether communication is permitted according to the request from the session server, to control the setting of the firewall. With this feature, individual session servers do not need to hold information about firewalls, nor do they need to hold the trust relationship with each firewall, so that the system configuration can be simplified and the processing load can be reduced.

Figure 15:
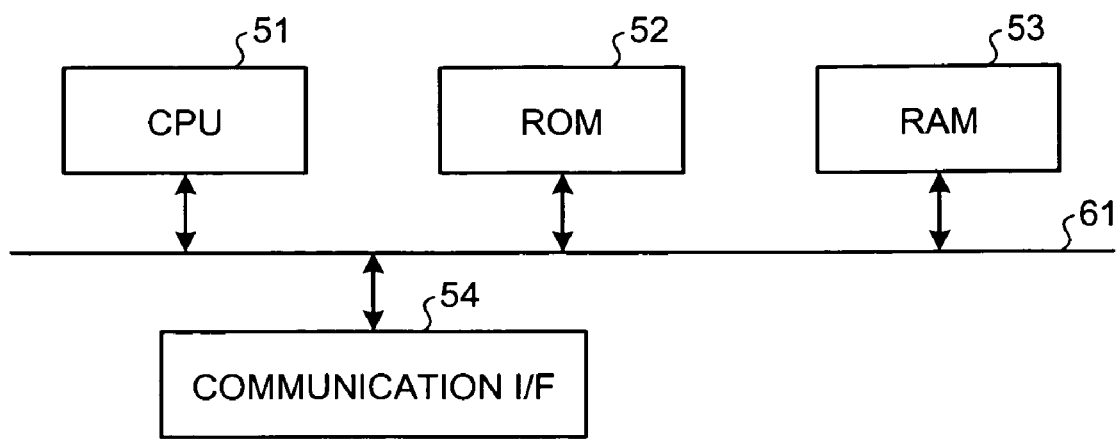
FIG. 15 is a schematic of a hardware configuration of the communication control apparatus.

The hardware configuration of the communication control apparatus is explained below with reference to FIG. 15. The communication control apparatus includes a control unit such as a central processing unit (CPU) 51, a storage unit such as a read-only memory (ROM) 52 and a random access memory (RAM) 53, a communication interface (I/F) connected to a network to perform communication, an external storage unit such as a hard disk drive (HDD) and a compact disk (CD) drive, a display unit such as a display, an input unit such as a keyboard and a mouse, and a bus 61 communicating with the units. The hardware is configured with an ordinary computer.

A communication control program executed in the communication control apparatus is provided by being recorded in a computer-readable recording medium in a file of an installable format or of an executable format. Specifically, the computer-readable recording medium includes a compact disk read-only memory (CD-ROM), a flexible disk (FD), a compact disk recordable (CD-R), and a digital versatile disk (DVD).

The communication control program can be provided by being stored in a computer connected to a network such as the Internet and causing the program to be downloaded via the network. Furthermore, the communication control program can be provided or distributed via a network such as the Internet.

The communication control program can also be provided by being previously embedded in a ROM or the like.

The communication control program is formed in a module structure including the respective units (receiving unit, authenticating unit, determining unit, generating unit, and transmitting unit). As actual hardware, the CPU 51 (processor) reads the communication control program from the recording medium to execute the program, and the units are thereby loaded on a main storage unit so that the units are generated on the main storage unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication control apparatus controlling communication through a firewall between an internal device connected to an internal network and an external device connected to an external network, the communication control apparatus comprising:

an authenticating unit configured to perform authentication of the external device to decide whether the external device is authentic and to create a result of authentication indicative of whether the external device is authentic;

a first storage unit configured to store therein the result of authentication associated with first identification information unique to the external device;

a receiving unit configured to receive, from a server device that establishes communication between the external device and the internal device, a first message containing information that identifies a first application used for communication between the external device and the internal device, and the first identification information;

a determining unit configured to:

determine whether the external device is authentic based on the stored result of authentication associated with the first identification information contained in the first message; and determine whether the first application can be permitted;

a generating unit configured to generate, when the determining unit determines that the external device is authentic and that the first application can be permitted, a second message to set a first port in the firewall, the first port being a port used for communication between the external device and the internal device using the first application; and a transmitting unit configured to transmit the second message generated by the generating unit to the firewall.

2. The communication control apparatus according to claim 1, further comprising a second storage unit configured to previously store therein setting information relating to setting of the firewall, wherein the generating unit is configured to generate the second message by using the setting information stored in the second storage unit.

3. The communication control apparatus according to claim 2, wherein the setting information includes an address of the firewall, and the generating unit is configured to generate the second message in which the address of the firewall contained in the setting information is set as a destination address.

4. The communication control apparatus according to claim 2, wherein the setting information includes a control protocol used to control the firewall, and the generating unit is configured to generate the second message by using the control protocol contained in the setting information.

5. The communication control apparatus according to claim 2, wherein the setting information includes a format of the second message, and the generating unit is configured to generate the second message in the format contained in the setting information.

6. The communication control apparatus according to claim 2, further comprising a third storage unit configured to previously store therein second identification information unique to the firewall which needs to set permission of communication for the external device, wherein the second storage unit is configured to store therein the second identification information associated with the setting information, and the generating unit is configured to acquire the second identification information from the third storage unit, and to acquire the setting information corresponding to second identification information from the second storage unit, and to generate the second message based on acquired setting information.

7. The communication control apparatus according to claim 1, wherein, when the first message contains a port number used for the external device that performs communication with the internal device by using the first application, the generating unit is configured to generate the second message to set a port corresponding to the port number contained in the first message as the first port in the firewall.

8. The communication control apparatus according to claim 1, further comprising a fourth storage unit configured to store therein information relating to a usable application that is an application that can be used for communication between the external device and the internal device, wherein the generating unit is configured to generate the second message when the determining unit determines that the external device is authentic and when information relating to the first application is stored in the fourth storage unit as the usable application.

9. The communication control apparatus according to claim 8, further comprising a fifth storage unit configured to store therein information relating to a permission-capable application that is an application that is permitted to be used for communication between the external device and the internal device, wherein the fourth storage unit is configured to store therein information relating to a permitted application associated with the information relating to a second application that should be permitted before permitting communication by the permitted application, the determining unit is configured to acquire information relating to the second application from the fourth storage unit, and to determine whether the first application is a permission-capable application based on whether the second application is registered as the permitted application in the fifth storage unit, and the generating unit is configured to generate the second message when the determining unit determines that the external device is authentic and that the first application is the permission-capable application.

10. The communication control apparatus according to claim 1, wherein the receiving unit is further configured to receive a third message that requests authentication from the external device, and the generating unit is configured to acquire an address of the external device from the third message, and to generate the second message containing acquired address.

11. The communication control apparatus according to claim 1, wherein the generating unit is configured to generate the second message to set a second port in the firewall, the second port being used for a protocol which is used to establish communication between the external device and the server device, when the external device is determined to be authentic by the authenticating unit, and the transmitting unit is configured to transmit the second message to the firewall when the external device is determined to be authentic by the authenticating unit.

12. The communication control apparatus according to claim 11, wherein the generating unit is configured to generate the second message to permit the second port used for a Session Initiation Protocol (SIP) which is used to establish communication between the external device and the server device.

13. The communication control apparatus according to claim 1, wherein the authenticating unit is configured to perform authentication of the server device to decide whether the server device is authentic, the determining unit is further configured to determine whether the server device is authentic upon reception of the first message, and the generating unit is configured to generate the second message when the determining unit determines that the server device and the external device are authentic.

14. A method of controlling communication through a firewall between an internal device connected to an internal network and an external device connected to an external network, the method comprising:

performing authentication of the external device to decide whether the external device is authentic;

creating a result of authentication indicative of whether the external device is authentic;

storing the result of authentication associated with first identification information unique to the external device in a first storage unit;

receiving, from a server device that establishes communication between the external device and the internal device, a first message containing information that identifies a first application used for communication between the external device and the internal device, and the first identification information;

determining whether the external device is authentic based on the stored result of authentication associated with the first identification information contained in the first message;

determining whether the first application can be permitted;

generating, when it is determined at the determining that the external device is authentic and that the first application can be permitted, a second message to set a first port in the firewall, the first port being a port used for communication between the external device and the internal device by using the first application; and transmitting the second message generated at the generating to the firewall.

15. A computer program product having a non-transitory computer-readable recording medium containing a plurality of computer-executable instructions to execute a method of controlling communication through a firewall between an internal device connected to an internal network and an external device connected to an external network, and causing a computer to execute the plurality of instructions comprising:

performing authentication of the external device to decide whether the external device is authentic;

creating a result of authentication indicative of whether the external device is authentic;

storing the result of authentication information associated with first identification information unique to the external device in a first storage unit;

receiving, from a server device that establishes communication between the external device and the internal device, a first message containing information that identifies a first application used for communication—between the external device and the internal device, and the first identification information;

determining whether the external device is authentic based on the stored result of authentication associated with the first identification information contained in the first message;

determining whether the first application can be permitted;

generating, when it is determined at the determining that the external device is authentic and that the first application can be permitted, a second message to set a first port in the firewall, the first port being a port used for communication between the external device and the internal device by using the first application; and transmitting the second message generated at the generating to the firewall.

* * * * *